C. M. MURCH.
Drays.

No. 152,244. Patented June 23, 1874.

UNITED STATES PATENT OFFICE.

CHAUNCEY M. MURCH, OF CINCINNATI, OHIO.

IMPROVEMENT IN DRAYS.

Specification forming part of Letters Patent No. 152,244, dated June 23, 1874; application filed February 24, 1874.

*To all whom it may concern:*

Be it known that I, CHAUNCEY M. MURCH, of Cincinnati, Hamilton county, Ohio, have invented a new and useful Dray or Transfer-Wagon, of which the following is a specification:

This invention relates to a dray or transfer-wagon having a horizontal or nearly horizontal bed or platform, which is supported on four wheels in such a manner as to be elevated above the ground just far enough to clear ordinary obstructions—say, from sixteen to twenty-four inches, or any other suitable and convenient height.

Of the above-mentioned ground-wheels, the two rear ones are quite large in diameter, and are journaled upon an immovable axle-tree, while the two front wheels, on the contrary, are of ordinary size, and are journaled upon a swiveled axle, which is capable of rotating around a stout king-bolt. The forward end of the platform is coved or recessed, which recess is carried back far enough to allow the front axle to be turned around at a right or any other angle to the rear axle without bringing the smaller ground-wheels of the dray in contact with said platform or any other part of the vehicle. By this arrangement a maximum area of platform is obtained without an undue increase of wheel base, which would necessitate an increased length of vehicle that would render it practically unfit for use in the narrow and crowded thoroughfares, in which such vehicles are commonly used. Applied to the forward end of the platform is a fender or guard, composed of curved bars, which serve the double purpose of preventing goods slipping off at the cove or recess, and which also act as a coupling device for uniting the bed of the vehicle with the king-bolt and running-gear of the front axle. The king-bolt is carried up a considerable distance, and is connected, by a system of overhead braces and ties, with an encircling frame, to which the spindles of the rear wheels are firmly welded or otherwise securely attached. This overhead bracing not only serves to unite, in the most secure manner, the front and rear running-gear of the vehicle, but it acts as a frame-work to support an awning or other screen that may be temporarily applied to the dray for the purpose of protecting its load from the inclemencies of the weather.

Figure 1:
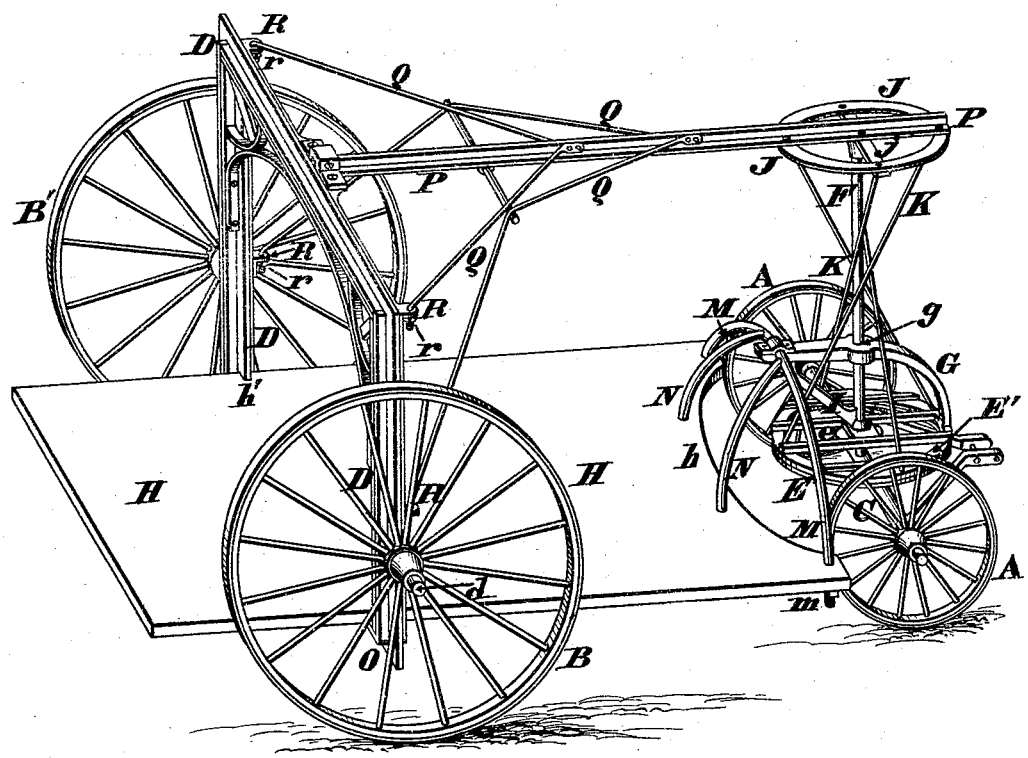
Figure 2:
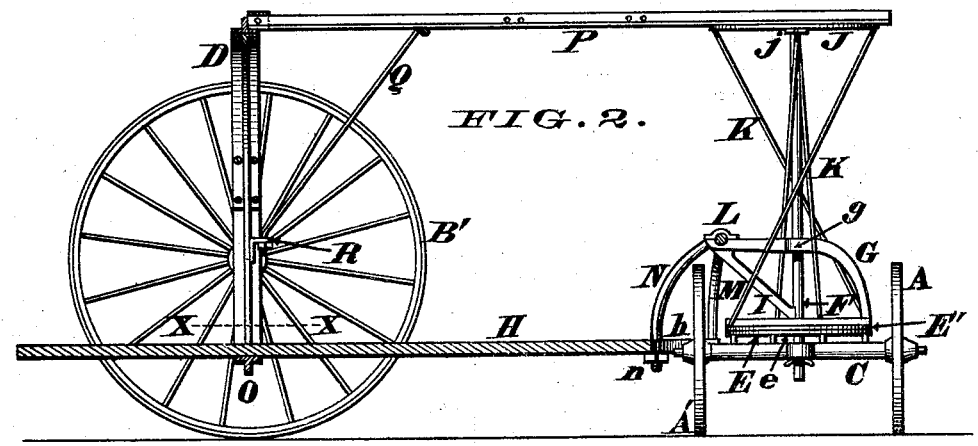
Figure 3:
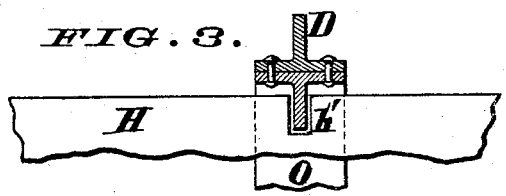

Figure 1 is a perspective view of my improved dray in its most complete form. Fig. 2 is a longitudinal section of the same, the front axle being shown turned around so as to stand at right angles to the rear axle. Fig. 3 is a horizontal section of the same at the line *x x*, on a somewhat enlarged scale.

A A' and B B' represent, respectively, the two front and two rear wheels of the dray, of which the front ones, A A', are applied to a customary swiveling axle, C, while the rear ones, B B', are journaled upon spindles *d*, that project from an encircling frame, D. The front axle C is provided with a fifth-wheel, composed of the two customary members E E', having central disks or plates *e*, through which the king-bolt F passes before being engaged with the axle C, as more fully shown in Figs. 2 and 4. Attached to the front part of the upper member E' of the fifth-wheel is a stout bar, G, which is bent upward and then projected rearward a sufficient distance to enable it to serve as a support for the front portion of the platform H of the vehicle.

In order to prevent the weight of the dray and its load depressing or breaking down the rear end of this supporting-bar, I provide a diagonal brace, I, which extends from said bar to the king-bolt F, and is united to the latter at or near its junction with the fifth-wheel. This supporting-bar is perforated at *g*, to allow the king-bolt to pass through it, after which said bolt is carried up a suitable distance—say, from four to six feet—and then secured to the transverse arm *j* of an annulus, J, that is located directly above the fifth-wheel of the dray, the ring J and wheel E E' being of about the same diameter. Extending in an oblique direction from the upper member E' of the fifth-wheel to the elevated annulus J are a number of stout rods or braces, K. These rods or tubes (for gas-pipes may be used, if preferred) serve to maintain the members E' and J in their proper relative position to each other, and they effectually prevent any displacement of the wheel and annulus, no matter how rough and uneven the road may be. The rear end of the supporting-bar G is furnished with a box, L, or other suitable coupling device that takes hold of a bar, M, at or near the mid-length of the latter, said bar M being bent so as to span the cove $h$ of the bed or platform H of the dray. The ends of this bar are furnished with nuts $m$, upon which the platform H rests. Welded to or otherwise immovably attached to the bar M are two or more curved bars N, whose lower ends are provided with nuts $n$, which are the same as the ones $m$, and employed for a similar purpose. These curved rods M N should be applied as near the cove $h$ as practicable, so as not to encroach too much upon the available area of the platform.

It will be seen that this system of curved rods or pipes not only affords a light and secure supporting-frame for the front portion of the dray, but it also acts as a screen or fender to prevent goods or the driver falling down through the cove $h$, and thereby becoming entangled with the running-gear to the great danger of life and property. The cove $h$ should be of such dimensions as to allow the front axle-tree C to be turned completely around, either to the right or left, without bringing either of the wheels A or A' in contact with the platform H, or with the fender M N. O represents the rear axle, which is composed of T angle-iron, said axle being merely a continuation of the encircling frame D. This axle is bent, as shown, so as to allow the platform H to be brought as low down as practicable; but, as said axle-tree and frame are the subjects of a distinct application for patent made by me, no further description of them is needed at the present time. The platform H is notched on each side at $h'$, so as to fit snugly around the webs of the inner angle-irons of the encircling frame D, by which arrangement the draft upon the platform is transferred directly to the lower part of said frame, thereby relieving the overhead braces of any strain whatever, the functions of said braces being merely to maintain the frame D in its proper vertical position. These overhead braces consist essentially of an angle-iron beam, P, disposed longitudinally of the dray, and serving to connect the frame D with the annulus J. Attached to the central beam P are rods Q, which extend back and pass through perforated lugs R on the frame D, the rods being secured in said lugs by nuts $r$. A secondary platform, S, is also provided, which is parallel with the one H, and of about the same dimensions, spring T being interposed between the two platforms so as to enable the upper one to yield with every vibration of the dray. The upper platform S is notched at $s$ and $s'$, the former being to allow it to vibrate without coming in contact with the fender N, while the other notches $s'$ fit around the webs of the inner angle-irons of the bent axle O. The rearward extension of the supporting-bar G, instead of terminating at the coupling-box L, as shown in Figs. 1 and 2, is provided with a downwardly-curved portion, G', having a flange, $g'$, to enable said member G' to be bolted securely to the platform H near its cove $h$. This extension G' is necessary in the modified form of the dray, on account of the overhead bracing being dispensed with, and unless some provision be made for supporting the forward end of the platform upon the axle C the dray would sag down and come in contact with the ground.

The distinguishing feature of my invention is the platform H, having the cove $h$ in its front end, and being suspended as near the ground as circumstances will allow.

By recessing the front end of the platform a short-coupled vehicle is produced, which can be backed up to the curb-stone and loaded directly from the sidewalk, and that without blockading the streets; the front axle being turned around at right angles to the rear axle, so as to dispose the horses longitudinally of the thoroughfare, instead of transversely of the same. Or the vehicle can be guided in such a manner as to cause either of the front corners of the platform to project some distance over the sidewalk by simply turning the horses obliquely to the thoroughfare, and then backing them until one of the wheels A or A' strikes the curb-stone. It is immaterial whether the vehicle be backed squarely up against the curb or caused to approach the same in the oblique manner just described, as it can be loaded with the greatest facility in either case, the platform being low down, level, or nearly so, and affording an open and unobstructed area from end to end, and from side to side.

My platform being level enables me to dispense entirely with the numerous pins that are necessary on all drays having inclined beds, as a load, when once placed upon my vehicle, has no tendency to slip off, but remains in its original position until delivered at its destination.

The drawings show the dray as supported upon axles whose lengths are as three feet to five feet; but these proportions may be varied to suit circumstances, although the length of the front axle should never equal the width of the platform H.

By making this axle short enough to turn within a cove less than the width of the platform the utmost economy of space is obtained, and the dray has the maximum of carrying capacity, without being so large and unwieldy as to encroach upon the limited area of crowded thoroughfares, and thereby obstruct travel.

I claim as new and of my invention—

The combination of the platform H, frame D, reach P, brace-rods Q, sockets R, king-bolt F, bearing G, and swiveled front gear A C, substantially as set forth.

In testimony of which invention I hereunto set my hand.

CHAUNCEY M. MURCH.

Attest:
  GEO. H. KNIGHT,
  S. B. SPEAR.